(12) United States Patent
Park et al.

(10) Patent No.: US 6,642,312 B2
(45) Date of Patent: Nov. 4, 2003

(54) POLYOLEFIN-BASED COMPOSITE RESIN COMPOSITION HAVING HIGH STRENGTH AND LOW LINEAR EXPANSION

(75) Inventors: Bong-Hyun Park, Kyoungki-do (KR); Sung-Jun Lee, Kyoungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/033,043

(22) Filed: Dec. 26, 2001

(65) Prior Publication Data

US 2002/0123572 A1 Sep. 5, 2002

(30) Foreign Application Priority Data

Dec. 28, 2000 (KR) .......................... 2000-84703

(51) Int. Cl.$^7$ .......................... C08L 23/00; C08L 23/04; C08K 3/26; C08K 3/34
(52) U.S. Cl. .................. 525/191; 525/240; 524/425; 524/447; 524/449; 524/451; 524/452; 524/492
(58) Field of Search .................. 525/191, 240; 524/425, 447, 449, 451, 452, 492

(56) References Cited

U.S. PATENT DOCUMENTS 5,763,520 A * 6/1998 Park et al. .................. 524/451
5,985,973 A * 11/1999 Sumitomo et al. .......... 524/451

FOREIGN PATENT DOCUMENTS

| EP | 0 496 625 A2 | 1/1992 |
| EP | 0 557 124 A1 | 2/1993 |
| KR | 99-0204658 | 3/1999 |
| KR | 99-0033557 | 5/1999 |
| KR | 99-0033558 | 5/1999 |
| KR | 99-0039953 | 6/1999 |

* cited by examiner

Primary Examiner—Nathan M. Nutter
(74) Attorney, Agent, or Firm—Pennie & Edmonds LLP

(57) ABSTRACT

The present invention relates to a polyolefin-based composite resin composition having excellent dimensional stability due to low mold shrinkage, low linear thermal expansion coefficient and low heat sag as well as having excellent mechanical strength, impact resistance, heat resistance, injection molding plasticity and surface smoothness of a product. The composition includes: 30–80% by weight of a crystalline ethylene-propylene copolymer; 5–40% by weight of an ethylene-α-olefin copolymer; 5–40% by weight of an inorganic fortifier; and additives.

21 Claims, No Drawings

POLYOLEFIN-BASED COMPOSITE RESIN COMPOSITION HAVING HIGH STRENGTH AND LOW LINEAR EXPANSION

FIELD OF THE INVENTION

The present invention relates to a polyolefin-based composite resin composition having high strength and low linear expansion, and more particularly, to a polyolefin-based composite resin composition having excellent dimensional stability due to low molding shrinkage, low linear thermal expansion coefficient and low heat sag as well as excellent mechanical strength, impact resistance, heat resistance, injection molding plasticity and smoothness of a product.

BACKGROUND OF THE INVENTION

Thermoplastic resins such as polyethylene and polypropylene have relatively low specific gravity, are inexpensive as compared to other resins, and have superior mechanical strength and processability. These resins have been widely applied in industry such as conventional plastic products, automobiles, electronic and aeronautical industry. However, it is difficult to apply the polyolefin-based resins to a field requiring highly specific functions due to the large limitations in properties of the resins themselves. The polypropylene resins in particular are much restricted in their industrial applications because their glass transition temperature is 0° C. and thus the impact strength is very low both at room temperature and a low temperature.

As a way to solve these problems of the polyolefin-based resins, composite polyolefin-based resins with an added function have been prepared wherein different kinds of resins are blended or mineral filler is added to a given resin, thus enabling the composite to be used as parts for automobiles and electronic goods, which has been otherwise seldom possible when conventional polyolefin-based resins are employed.

Polyolefin-based resins are widely used in the above-mentioned case, and the above polyolefin-based resins, for instance, comprise polypropylene, a polyolefin-based resin, as a substrate; an ethylene-α-olefin copolymer or an elastomer as an impact fortifier; and an inorganic filler as a rigidity fortifier. Further, the kinds and the contents of the above additives have been modified in order to produce compositions having improved physical properties as well as thermal properties, and some of them are already placed into practical fields.

In general, a composite resin is a material with a newly added function, which cannot be acquired by the polymer itself, wherein a polymer is used as a substrate and a filler or a fortifier is melt-mixed by using a kneader or an extruder. However, the composite resin has a few disadvantages. First, the kind, property, size and content of a resin, a filler and a fortifier should be adjusted based on the uses and the characteristics of a field to be applied. Second, the processor and the processing conditions of a resin should be properly determined so that the processability and the reproducibility of a resin can be continuously maintained. The specific property of a resin can be improved by the addition of a filler because the physical property of the composite resin is greatly influenced by the change in processing conditions of a resin. Moreover, the kinds and the contents of additives such as stabilizers for heat resistance and for weather resistance, which are added for the purpose of preventing deterioration of a resin due to a modification or aging especially under high temperature and high pressure condition within the extruder during the process of a resin, are also important factors used in determining the properties of a composite resin.

There exists an interface between materials with different properties such as the above-mentioned polymer substrate, a filler and additives. The raw materials, the processor and the processing conditions of a resin should be carefully selected because the property of a composite resin can be greatly influenced by the level of interfacial adhesiveness at a given interface.

The conventional resins that have been used in the manufacture of interior and exterior parts of an automobile include acrylonitrile-butadiene-styrene copolymer, polycarbonate/acrylonitrile-butadiene-styrene copolymer alloy, polycarbonate/polybutylene terephthalate alloy, polyamide, polyurethane, etc. The resins except the polyamide can be used as a polyolefin-based composite resin with respect to light-weight, cost-effectiveness and recycleability. However, polyamide can generate problems when used as a polyolefin-based composite resin because of the drawbacks in mechanical and thermal properties and is thus not suitable for a polyolefin-based composite resin.

If the above-mentioned resins are to be used as polyolefin-based composite resins, the resins should have superiorities in mechanical strength, impact resistance, heat resistance, dimensional stability, and scratch resistance. The resins to be substituted by polyolefin-based resins should also have a superior plasticity to comply with the current trend to manufacture light-weight parts and automobiles and the processing time should be also reduced for the improvement of the productivity as well as cost-effectiveness. Moreover, the external appearance and the coating property should be excellent depends on whether it is a coating type or a non-coating type. Intensive studies have been conducted to produce polyolefin-based composite resins that can satisfy all the above-mentioned requirements. In particular, the studies to develop polyolefin-based composite resin compositions are directed to their use as relatively large parts of an automobile such as bumper fascia, door garnish, side sill molding, and instrument panel, and more specifically to those compositions having low shrinkage and low linear thermal expansion coefficient. The essential properties of raw materials to be considered when using them as parts of an automobile are rigidity, tensile strength, elongation, density, heat deflection temperature, linear thermal expansion coefficient, etc. Of these, rigidity is the most critical property for a raw material and it is expressed in terms of flexural modulus and surface hardness. Bumper fascia and instrument panel have relatively large surface area for their relatively low thickness and thus they can be easily bent or sagged when they do not have sufficient rigidity. In fact, the thickness of final products of those parts tend to become thinner due to the effort to reduce the cost of raw materials and the recent trends toward the manufacture of light-weighted automobiles and thus it is required to develop raw materials having higher flexural modulus. In addition, the raw materials are also preferred to have low linear thermal expansion coefficient as well as low heat sag and dimensional stability for the assembly into a given automobile.

The linear thermal expansion coefficient of plastic is generally 4–8 times greater than that of steel and thus the final product becomes sagged or distorted after assembly according to the change in temperature/weather. Therefore, composite products, manufactured by properly adding inorganic filler into a basic resin such as polypropylene or rubber, have been developed in order to solve the above problems. These products containing inorganic filler exhibit a reduced linear thermal expansion coefficient along with an increased flexural modulus. However, the impact strength of the products is low at a low temperature and therefore it is necessary to adjust the kinds and the amount of a selected inorganic filler to be added to harmonize with the overall properties of the final product. Moreover, it is also required to develop a product with low shrinkage to meet the requirements of a product such as easiness in designing a mold to form a product, dimensional stability in coating, and little post-modification of a product.

The conventional composite polyolefin-based resins used in forming parts of an automobile comprise crystalline polypropylene as an active ingredient. The crystalline polypropylene may have ethylene-propylene copolymer (propylene content is 92–95 weight % and ethylene content is 5–8 weight %) characterized by having 7–12 weight % of ethylene-propylene rubber and 20–45 g/10 min of melt index. Further, for the improvement of impact resistance of the above crystalline polypropylene resin, there is usually added ethylene-propylene copolymer or ethylene-α-olefin based rubber, such as ethylene-octene copolymer, wherein the (non-ethylene) α-olefin content is 25–45 weight percent. For the improvement of rigidity of the above crystalline polypropylene resin, there is added minute talc with an average particle size of 2–4 $\mu$m and then they are mechanically melt-mixed by using a mixer or an extruder. However, there is usually required a large amount of talc and olefin-based rubber of high expense for the production of polypropylene-based composite resin composition having the required impact strength and rigidity.

European Patent Application No. 557,124 discloses a thermoplastic polymer composition comprising: (i) 100 parts by weight of a thermoplastic polymer component consisting of 55–75% by weight of a highly crystalline ethylene-propylene block copolymer and 25–45% by weight of a crystalline ethylene copolymer having a melting point of 30–100° C., and (ii) 1–25 parts by weight of talc having an average particle size of 5 $\mu$m or less. However, the use of highly crystalline polypropylene to increase rigidity results in the increase in production cost and is thus not suitable for parts of an automobile. Further, excessive increase in rigidity also results in deterioration of coating due to decrease in resistance to cold shock as well as increase in crystallinity of a given composition (see, for example; European Patent Publication No. 496,625).

Korean Patent Unexamined Publication Nos. 99-033,557, 99-033,558 and 99-039,553 disclose polyolefin-based composite resin compositions for parts of an automobile, however, the polyolefin-based composite resin compositions are prepared by using only singly inorganic fortifier and they are not sufficient to meet the property requirements for the parts of an automobile.

Korean Patent No. 204,658 discloses a composite resin composition with low linear expansion comprising 45–70% by weight of ethylene-propylene copolymer having 0.5–15% by weight of ethylene-propylene rubber; 10–25% by weight of ethylene-propylene copolymer rubber and 5–15% by weight of ethylene-octene copolymer rubber as an ethylene-α-olefin copolymer rubber, respectively; and –15% by weight of talc as an inorganic filler. Thus manufactured composite resin composition has a linear thermal expansion coefficient of $5-6\times10^{-5}$ mm/mm ° C. thus showing improved mechanical property and dimensional stability as compared to the conventional composite resin compositions, however, they are still not sufficient to completely substitute for replacing polycarbonate/polybutylene terephthalate alloy that are widely used in external parts of an automobile.

SUMMARY OF THE INVENTION

The invention relates to a polyolefin-based composite resin composition with low linear thermal expansion not only having excellent mechanical strength, impact resistance, heat resistance and injection molding, and smoothness of a final product dimensional stability, but also having an excellent dimensional stability due to the low shrinkage, low linear thermal expansion coefficient and low heat sag.

An object of the present invention is to provide a polyolefin-based composite resin composition having high strength and low linear thermal expansion.

Another object of the present invention is to provide external parts of an automobile by using said polyolefin-based composite resin composition having high strength and low linear expansion which can substitute for polycarbonate/polybutylene terephthalate alloy which has been widely used in manufacturing external parts of an automobile such as bumper fascia.

The present invention relates to a polyolefin-based composite resin composition having high strength and low linear thermal expansion comprising:

(i) 30–80% by weight of a crystalline ethylene-propylene copolymer;
(ii) 5–40% by weight of an ethylene-α-olefin copolymer;
(iii) 5–40% by weight of an inorganic fortifier; and
(iv) additives.

In one embodiment, the crystalline ethylene-propylene copolymer contains 0.5–35% by weight of ethylene-propylene rubber and comprises at least one ethylene-propylene copolymer having a melt index of 5–60 g/10 min (230° C., 2.16 kg) wherein said ethylene-propylene copolymer consists of 1–50% by weight of ethylene and 50–99% by weight of propylene.

In one embodiment, the ethylene-α-olefin copolymer contains 20-50% by weight of α-olefin and comprises at least one ethylene-α-olefin copolymer having a melt index of 0.1–15 g/10 min (230° C., 2.16 kg).

In one embodiment, the α-olefin in said ethylene-α-olefin copolymer is selected from the group consisting of 1-propylene, 1-butene, 1-hexene, and 1-octene.

In one embodiment, the ethylene-α-olefin copolymer contains 20–50% by weight of propylene and 5–20% by weight of ethylene-propylene copolymer rubber having a melt index of 0.1–5 g/10 min (230° C., 2.16 kg).

In one embodiment, the ethylene-α-olefin copolymer contains 20–50% by weight of octene and 5–20% by weight of ethylene-octene copolymer rubber having a melt index of 0.1–15 g/10 min (230° C., 2.16 kg).

In one embodiment, the inorganic fortifier is selected from the group consisting of talc, calcium-carbonate, mica, glass fiber, asbestos and kaolin. In a preferred embodiment, talc is planar aspect and has an average particle size of 2–4 $\mu$m and aspect ratio of 3–20.

In one embodiment, the additives comprise 0.05–0.5% by weight of a phenol-based primary antioxidant, 0.05–0.5% by weight of an amine-based secondary antioxidant, 0.05–0.5% by weight of a hals-based UV stabilizer, 0.05–0.1% by weight of a processed lubricant, 0.05–3% by weight of an aminotitanium-based or aminosilane-based coupling agent, and 0.05–0.1% by weight of an alkylamine-based antistatic agent.

The composites of this invention are particularly useful for automobile components.

In another embodiment, the polyolefin-based composite resin composition having high strength and low linear thermal expansion comprising: a) between about 45% and about 55% by weight of a crystalline ethylene-propylene copolymer, wherein at least 30% by weight of the composition comprises a crystalline ethylene-propylene copolymer with a melt index of between about 40 and about 60; b) between about 20 and about 30% by weight of an ethylene-α-olefin copolymer, wherein at least 5–20% by weight of the ethylene-α-olefin is an ethylene-propylene copolymer containing 20–50% by weight of propylene and 5–20% by weight of ethylene-propylene copolymer rubber having a melt index of about 0.5 to about 4 g/10 min (230° C., 2.16 kg), or contains 20–50% by weight of octene and 5–20% by weight of ethylene-octene copolymer rubber having a melt index of about 3 to about 15 g/10 min (230° C., 2.16 kg), or a mixture thereof; c) between about 20 and about 30% by weight of an inorganic fortifier with an aspect ratio of at least 6 and with an average particle size of between about 1 and about 8 microns; and d) between about 0.2 and about 3% of additives. In one embodiment, the ethylene-α-olefin copolymer contains 20–50% by weight of propylene and 5–20% by weight of ethylene-propylene copolymer rubber having a melt index of 1 to about 4 g/10 min (230° C., 2.16 kg). In another embodiment, the ethylene-α-olefin copolymer contains 20–50% by weight of octene and 5–20% by weight of ethylene-octene copolymer rubber having a melt index of 5 to about 12 g/10 min (230° C., 2.16 kg). In a preferred embodiment, the inorganic fortifier comprises talc which has an average particle size of 2–4 μm. Again, in one embodiment, the composite contains one or more additives such as 0.05–0.5% by weight of a phenol-based primary antioxidant, 0.05–0.5% by weight of an amine-based secondary antioxidant, 0.05–0.5% by weight of a hals-based UV stabilizer, 0.05–0.1% by weight of a processed lubricant, 0.05–3% by weight of an aminotitanium-based or aminosilane-based coupling agent, and 0.05–0.1% by weight of an alkylamine-based antistatic agent.

In a third embodiment, the composite resin composition having high strength and low linear thermal expansion comprises:

a) between about 40% and about 60% by weight of a crystalline ethylene-propylene copolymer manufactured by polymerization of monomers in the presence of a combinatory catalyst, a Ziegler-Natta type catalyst, and an alkylaluminium compound or under a catalyst containing a titanium compound or a magnesium compound and containing between about 18 and about 34% of ethylene-propylene rubber, wherein the degree of crystallinity is between about 20 and about 30% and the melt index of the crystalline ethylene-propylene copolymer of the present invention is preferred to be between about 5 and about 60 g/10 min (210 C, 2.16 kg);

b) between about 15 and about 35% by weight of an ethylene-α-olefin copolymer wherein the α-olefin is selected from the group consisting of 1-propylene, 1-butene, 1-hexene, 1-octene, or mixtures thereof, wherein the ethylene-α-olefin copolymer is polymerized from monomers using a Ziegler-Natta catalyst, a vanadium-based catalyst, a chromium-based catalyst, or mixtures thereof, and comprise between 20 and 50% by weight of the α-olefin, and at least 5% by weight of ethylene-octene copolymer rubber;

c) between about 15 and about 30% by weight of an inorganic fortifier with an aspect ratio of at least 6 and with an average particle size of between about 1 and about 8 microns; and d) between about 0.2 and about 3% of additives.

The crystalline ethylene-propylene copolymer rubber is advantageously directly manufactured by introducing excessive amount of gaseous ethylene into a reactor during the polymerization of the ethylene and propylene copolymers.

The present invention is described in detail as set forth hereunder.

DETAILED DESCRIPTION OF THE PREFERRED EMBODIMENTS

The polyolefin-based composite resin composition of the present invention not only has the general properties required as a resin composition such as excellent impact resistance, rigidity and heat resistance but also has an improved injection molding property which is then able to produce thinner wall thus contributing to the manufacture of light-weighted automobiles, has a superior external appearance due to the excellent surface smoothness of a molded product by injection, has an improved dimensional stability and easiness of its assembly into an automobile, minimizes post-modification after coating or molding, and maximize the easiness in designing a mold for plasticizing a final product.

This invention is explained in more detail with respect to each component of the polyolefin-based composite resin composition with high strength and low linear expansion.

(1) Crystalline Ethylene-propylene Copolymer

Crystalline ethylene-propylene copolymers are generally manufactured by polymerization of monomers under the presence of a combinatory catalyst such as titanium trichloride, a Ziegler-Natta type catalyst, and an alkylaluminium compound or under a catalyst containing a titanium compound or a magnesium compound. The present invention employs at least one, or more, kinds of crystalline ethylene-propylene copolymer manufactured by polymerizing 1–50% by weight of ethylene and 50–99% by weight of propylene under the presence of the above-mentioned catalyst, and the above polymerized crystalline ethylene-propylene copolymer contains 0.5–35% by weight, for example 18–34%, of ethylene-propylene rubber. The crystalline ethylene-propylene copolymer of the present invention is a resin wherein the melting point of the polypropylene is 165° C., the melting point of polyethylene is 120° C. and the degree of crystallinity is 20–30%, for example 25%. The melting point of polyethylene and polypropylene are measured by using Differential Scanning Calorimeter via the conventional methods. The weight average molecular weight of crystalline ethylene-propylene copolymer of the present invention is 190,000–265,000 and its number average molecular weight is 37,000–50,000, and they are both measured by using Gel Permeation Chromatography. The melt index of the crystalline ethylene-propylene copolymer of the present invention is preferred to be 5–60 g/10 min (210° C., 2.16 kg), for example be 20–40 g/10 min (210° C., 2.16 kg). The plasticity of a composite resin composition becomes deteriorated when the melt index is below 5 g/10 min while the impact resistance is decreased when the melt index exceeds 60 g/10 min.

The crystalline ethylene-propylene copolymer of the present invention is characterized in that ethylene-propylene copolymer rubber is directly manufactured by introducing excessive amount of gaseous ethylene into a reactor during the polymerization of copolymers. Thus the above ethylene-propylene copolymer rubber becomes dispersed as particles uniform in size and with excellent compatibility with the propylene component, which is present in excess in the above manufactured ethylene-propylene copolymer rubber. The polypropylene matrix results in the increase in interfacial adhesiveness thus improving the impact strength. Therefore, the polyolefin-based composite resin composition using the crystalline ethylene-propylene copolymer resin of the present invention can drastically reduce the amount of ethylene-α-olefin copolymer rubber which is normally added in order to fortify the impact resistance in other composite resin compositions. As used herein, the term ethylene-α-olefin copolymer rubber excludes the crystalline propylene-ethylene copolymers of this section. As a result, the polyolefin-based composite resin composition of the present invention has an advantage in terms of cost and the deviations usually present among different lots of products manufactured by using the above composite resin compositions can be greatly eliminated thus enabling to produce products with uniform properties and functions. The amount of the above crystalline ethylene-propylene copolymer is preferred to use 30–80% by weight, in one embodiment between 50–70% by weight, for example 55–65% by weight of the total composition. The impact strength decreases if the amount exceeds 80% by weight while the plasticity becomes poor when the amount is less than 30% by weight.

(2) Ethylene-α-olefin Copolymer

The ethylene-α-olefin copolymer of the present invention is mainly used for the purpose of improving impact strength. Examples of α-olefins that can be used in the polymerization of ethylene-α-olefin copolymers are 1-propylene, 1-butene, 1-hexene, 1-octene, and the like and they are preferred to use selectively according to a desired use. It is more preferred to use 1-propylene or 1-octene. The ethylene-α-olefin copolymer of the present invention can be manufactured by using a Ziegler-Natta type catalyst, and is more preferred to use a vanadium- or chromium-based catalyst. In the present invention, ethylene-α-olefin copolymer contains 20–50% by weight of α-olefin and is preferred to comprise at least one ethylene-α-olefin copolymer having a melt index of 0.1–15 g/10 min (230° C., 2.16 kg), for example 0.5–10 g/10 min (230° C., 2.16 kg). In a preferred embodiment use ethylene-propylene copolymer rubber or ethylene-α-octene copolymer rubber or a mixture thereof. The above ethylene-propylene copolymer rubber contains 20–50% by weight of propylene and has a melt index of 0.1–5 g/10 min (230° C., 2.16 kg), Mooney viscosity of 19–85 ML1+4 (100° C.), and specific gravity of 0.86 g/cm$^3$. The above ethylene-octene copolymer rubber contains 20–50% by weight of octane, preferably 20–30% by weight of octane, has a melt index of 0.1–15 g/10 min (230° C., 2.16 kg), Mooney viscosity of 19–50 ML1+4 (121° C.) (s. g.: 0.87 g/cm$^3$).

The content of above ethylene-α-olefin copolymer is preferred to be 5–40% by weight of the total composition, and more preferably 5–20% by weight, for example 7–13% by weight. If the content is less than 5% by weight, the impact strength of a product becomes deteriorated. On the other hand, if the content is above 40% by weight, the impact strength of a product is improved but the mechanical strength is decreased.

(3) Inorganic Fortifier

In the present invention, an inorganic fortifier is added to prevent the deterioration in impact strength of a product due to the use of a filler and also to fortifying rigidity of a product and low linear expansion. Examples of inorganic fortifiers are talc, calcium-carbonate, mica, glass fiber, asbestos, kaolin and the like, and talc is preferred. When talc is used as an inorganic fortifier, it is preferred to use a talc has a planar aspect with an average particle size of 2–4μm and aspect ratio of 3–20, for example 7–18. For the preparation of talc raw talc is crushed by using a roll miller or a crusher and then separated by using a classifier. Talc with improved interfacial adhesiveness via chemical treatment of the surface can be also used depending on the situations.

The preferred amount of inorganic fortifier is 5–40% by weight to the total composition, for example between 10% and 30% by weight. If the content is below 5% by weight, the resulting rigidity is not sufficient while if it exceeds 40% by weight the resulting rigidity is sufficient but the plasticity and impact strength are deteriorated.

(4) Additives

Appropriate additives can be added to the crystalline polyolefin-based composite resin composition of the present invention according to the desired uses. Examples of additives essential in the composite resin composition of the present invention are a secondary antioxidant, a UV stabilizer, a process lubricant, and an antistatic agent, and other additives such as a heat-resisting stabilizer, carbon black and pigments and a nucleating agent can be also added depending on the uses of the composite resin composition.

A coupling agent is used to increase the adhesive strength of a crystalline ethylene-propylene copolymer and an inorganic fortifier. Examples of the coupling agents are an amino silane group and an amino titanium group and the like and the amount of a coupling agent is preferred to be 0.05–3% by weight, for example 0.1–1% by weight, to the total composition.

The primary and secondary antioxidants and a heat-resisting stabilizer are used to prevent thermal decomposition while processing the polyolefin-based composite resin composition of the present invention.

Examples of primary antioxidants are the conventional phenol based compounds, and preferably 2,6-DI-t-butyl-4-methylphenol, a phenol based antioxidant, and the preferred amount of the primary antioxidant is 0.05–0.5% by weight, for example 0.1–0.4% by weight.

Examples of secondary antioxidants are conventional amine-based compounds, and preferably diphenyl-p-phenylenediamine, an amine-based antioxidant, and the preferred amount of the secondary antioxidant is 0.05–0.5% by weight, for example 0.1–0.4% by weight.

Examples of heat-resisting stabilizers are conventional phenol based compounds such as 2,6-DI-t-butyl-4-methylphenol, and conventional amine based compounds such as diphenyl-p-phenylenediamine, and the preferred amount of the heat-resisting stabilizer is 0.05–1.0% by weight, for example 0.1–0.4% by weight, to the total composition.

UV stabilizers are added to a composite resin composition to increase anti-weathering property of the composite resin as well as to prevent decomposition of the composite resin by UV. Examples of UV stabilizers are conventional HALS based compounds, benzophenone based compounds, benzotriazole based compounds, and the like, and preferably HALS based compounds such as [6-(1,1,3,3,-tetramethylbutyl)imino-1,3,5-triazine-2,4-diyl][2-(2,2,6,6-tetramethylpiperidyl)-imino], and the preferred amount of a UV stabilizer is 0.05–0.5% by weight to the total composition.

Process lubricants are added to improve the processability of the composite resin composition of the present invention and examples of the process lubricants are calcium-stearate, zinc-stearate and the like, and more preferably calcium-stearate, and the preferred amount of the process lubricants is 0.05–0.1% by weight to the total composition.

Antistatic agents are added to prevent the static electricity of the composite resin composition of the present invention and examples of the antistatic agents are conventional alkylamine based compounds, stearic acid based compounds and the like, and the preferred amount of the antistatic agents is 0.05–0.1% by weight to the total composition.

In addition, other additives such as carbon black, pigments, nucleating agents and the like can be added to the composite resin composition of the present invention for the purposes of color expression, fortification of weather resistance, etc., and the preferred amount of these additional additives is 0.1–5% by weight to the total composition.

The composite resin composition of the present invention can be obtained by mixing raw materials using a Henssel blender, a ribbon blender or a V-blender or by directly feeding each raw material into a processing apparatus according to a predetermined rate by using devices that are respectively assigned to supply each different raw material. The examples of the above processing apparatus are a single screw extruder, a twin screw extruder, a twin screw extruder wherein a part of the extruder can be used as an a supply hole) in addition to a preexisting hole, a Kneader mixer, a Banbery mixer, and the like. The composite resin compositions are melt-mixed by using the above processing apparatus and are formed into pellets. Here, the physical property and the functions of the resin compositions can vary according to the processing conditions and thus it is preferred to determine the optimal processing conditions by changing revolving numbers, amount of extrusion and processing temperature by using the twin screw extruder wherein a part of the extruder can be used as an a supply hole in addition to a preexisting hole, and then manufacture the desired composite resin composition.

The water content and the volatile components of thus manufactured composite resin composition are removed while going through the water removal step and are produced into either injected or extruded specimens, which are then measured for their mechanical and thermal properties according to American Society for Testing & Materials (ASTM). When necessary, self-made standard regulation can be also applied. The specimens are usually formed by injection by using a conventional injection molding machine for the measurement of their physical properties. The conditions for the injection are 200–230° C. for the cylinder temperature, 30–60° C. for the molding temperature, and injection pressure, hold pressure and injection rate are fixed into a region where the composite resin composition retains superior physical properties. The above specimens for measurement, after injection, are placed for about 48 hrs in an atmosphere where temperature is 23° C. and relative humidity is 50%, and then are subject to measurement. The physical properties thus obtained for these specimens of composite resin composition include melt index, tensile strength, flexural modulus, impact strength, heat deflection temperature, linear thermal expansion coefficient, molding shrinkage and heat sag according to ASTM.

Hereunder is given a detailed description of the present invention using the following examples, however, it should not be construed as limiting the scope of the present invention.

EXAMPLES 1–6

The ingredients shown in the following table 1 were melt-mixed according to the compositions in the Table 1 by using a twin screw extruder (screw L/D=40, Φ=52, revolution=300 rpm, amount of extrusion=100 kg/hr, processing temperature=200–220° C.) wherein a part of the extruder can be used as a supply hole in addition to a pre-existing supply hole and polyolefin-based composite resin composition was finally manufactured in the form of a pellet.

TABLE 1

| Composition | *Ex. 1 | *Ex. 2 | *Ex. 3 | *Ex. 4 | *Ex. 5 | *EX. 6 |
|---|---|---|---|---|---|---|
| A1 (wt %) | 20 | 10 |  |  | 10 |  |
| A2 (wt %) | 31 | 41 | 51 | 31 | 41 | 48 |
| A3 (wt %) |  |  |  | 20 |  |  |
| B1 (wt %) | 15 | 10 | 10 |  |  |  |
| B2 (wt %) |  |  |  |  |  |  |
| B3 (wt %) |  |  |  | 15 | 13 | 10 |
| B4 (wt %) | 8 | 13 | 13 | 8 | 10 | 13 |
| B5 (wt %) |  |  |  |  |  |  |
| F1 (wt %) |  |  |  |  |  |  |
| F2 (wt %) | 25 | 25 | 25 | 25 | 25 | 28 |
| F3 (wt %) |  |  |  |  |  |  |
| Additive | 1 | 1 | 1 | 1 | 1 | 1 |

(*Ex. = Example)

In the above Table 1, A1–A3 respectively represent crystalline ethylenepropylene copolymers having different physical properties, as shown in the following Table 2. B1–B5 respectively represent ethylene-α-olefin copolymer rubbers having different physical properties, as shown in the following Table 3. F1–F3 respectively represent inorganic fortifiers having different physical properties, as shown in the following Table 4.

TABLE 2

Properties of Crystalline EthylenePropylene Copolymers

| Physical Property | A1 | A2 | A3 |
|---|---|---|---|
| Melt Index (g/10 min) | 30 | 50 | 20 |
| Ethylene Content (wt %) | 7.8 | 8.0 | 48.8 |
| *Wt Average MW | 199000 | 189000 | 180000 |

(*Wt Average MW: weight average molecular weight)

TABLE 3

Properties of Ethylene-α-olefin Copolymer

| Physical Property | B1 | B2 | B3 | B4 | B5 |
|---|---|---|---|---|---|
| Melt Index (g/10 min) | 3.2 | 0.6 | 3.1 | 0.7 | 13 |
| α-olefin type | C3 | C3 | C3 | C3 | C3 |
| α-olefin content (wt %) | 527* | 28 | 30 | 28 | 28 |

Where C3 is propylene

Xxx Require clarification—527% xxx is 27%?

TABLE 4

Properties of Inorganic Filler

| Classification | F1 | F2 | F3 |
|---|---|---|---|
| Inorganic Fortifier Type | Calcium carbonate spherical | talc planar | Myca Plate |
| Average Diameter (μ) | 7 | 3 | 5 |
| Average aspect ratio | — | 10 | 10 |

In the above table 1, the amount of additives used were the same as in the following table 5, and the content of additives are weight % to the total composition.

TABLE 5

Additive Formulation

| Additive | Chemical Formula | (wt %) |
|---|---|---|
| Processing Lubricant | Calcium-stearate | 0.1 |
| Primary Antioxidant | Tetrakis[methylene(3,5-di-tetra-butyl-4-hydroxy-hydrocynamate)]methane | 0.1 |
| 2nd Antioxidant | Tris(2,4-di-tetra-butylphenyl)phosphate | 0.1 |
| Antistatic agent | Alkyl amine group | 0.1 |
| UV stabilizer | Poly-{[6-(1,1,3,3-tetramethylbutyl)imino-1,3,5-triazine-2,4-diyl][2-(2,2,6,6-tetramethyl-piperidyl)-imino]-hexamethylene-[4-(2,2,6,6-tetramethyl-piperidyl)-imino]} | 0.1 |
| Coupling agent | Aminosilane group or aminotitanium group | 0.3 |
| Carbon black | | 0.2 |

COMPARATIVE EXAMPLES 1–6

Polyolefin-based composite resin compositions were manufactured in the form of pellets according to the ingredients and compositions in the Table 6 by using the same method in Example 1.

TABLE 6

| Composition | *Comp. Ex. 1 | *Comp. Ex. 2 | *Comp. Ex. 3 | *Comp. Ex. 4 | *Comp. Ex. 5 | *Comp. Ex. 6 |
|---|---|---|---|---|---|---|
| A1 (wt %) | 54 | 40 | | | 41 | |
| A2 (wt %) | | 16 | 51 | 10 | | 54 |
| A3 (wt %) | | | | 41 | | |
| B1 (wt %) | | 10 | | | 10 | 10 |
| B2 (wt %) | 15 | | 14 | 6 | | |
| B3 (wt %) | | | | | 8 | |
| B4 (wt %) | 10 | | | 6 | | 5 |
| B5 (wt %) | | 13 | 11 | 8 | 5 | 10 |
| F1 (wt %) | 20 | 20 | | 28 | | |
| F2 (wt %) | | | | | | 20 |
| F3 (wt %) | | | 23 | | 35 | |
| Additive | 1 | 1 | 1 | 1 | 1 | 1 |

(*Comp. Ex. = Comparative Example)

Both water content and volatile content were removed from polyolefin-based composite resin compositions manufactured in the Examples 1–6 and Comparative Examples 1–6 and were produced into composite resin specimens by using an injector (IDE90EN, Korea) wherein cylinder temperature is 220° C. and molding temperature is 60° C. The specimens were placed for about 48 hrs in an atmosphere wherein temperature is 23° C. and relative humidity is 50%, and then allowed to measure melt index, tensile strength, flexural modulus, impact strength, heat deflection temperature, linear thermal expansion coefficient, molding shrinkage and heat sag according to ASTM.

The measurements were performed as described below.

(1) Melt Index (MI): Measured according to ASTM D1238 (230° C., 2.16 kg) and both manual and automatic measuring apparatus were used.

(2) Tensile Strength and Elongation: Measured according to ASTM D683 (Type I, cross-head speed=50 mm/min).

(3) Flexural Strength and Flexural Modulus: Measured according to ASTM D790 (cross-head speed=10 mm/min).

(4) Impact Strength: Measured according to ASTM D256 at room temperature and a low temperature (−30° C.). The rotating pendulum was 5 pound in weight.

(5) Heat Deflection Temperature: Measured according to ASTM D648. The load was 4.16 kg.

(6) Coefficient of Linear Thermal Expansion (CLTE): Measured according to ASTM D696 while changing the temperature in the range of from −30° C. to 80° C.

(7) Mold Shrinkage: Measured according to ASTM D955.

(8) Heat Sag: Specimens of the above composite resin with a dimension of 110(L)×20(W)×3(H) were fixed so that the longitudinal sides are in parallel with the floor of the oven and placed in the oven kept at 120° C. for about 1 hr and measured the changes before and after heat application.

(9) Comparison of Coating Adhesiveness: Specimens of the above composite resin with a dimension of 50(L)×100(W)×2(H) mm were coated with chloropolypropylene primer to have a thickness of 5–7 μm, followed by coating with urethane-based paint to have a thickness of 20–30 μm, and then hardened in an oven set at 85° C. for about 30 min. The specimens were then placed for about 24 hrs at room temperature and produced into one hundred grids of 2 mm and their coating adhesiveness were measured by using a tape.

The results are shown in the following Tables 7 and 8. The examples of the present invention have a melt index of at least 17, preferably at least 19 (g/10 min); a tensile strength of at least 175, preferably at least 180 (kg/cm3); an Izod Impact Strength of 4.5, preferably at least 5.5 (−30° C./kg-cm/cm); a linear thermal expansion below 4.5, preferably below $4(\times 10^{-5})$(mm/mm-° C.); a heat sag of at most 3, preferably below 2.5, and a heat deflection temperature of at least 110° C., preferably at least 113° C.

TABLE 7

Test Results

| Physical Property | *Ex. 1 | *Ex. 2 | *Ex. 3 | *Ex. 4 | *Ex. 5 | *Ex. 6 |
|---|---|---|---|---|---|---|
| Melt Index (g/10 min) | 17 | 20 | 22 | 17 | 19 | 20 |
| Tensile Strength(kg/cm$^3$) | 175 | 180 | 185 | 180 | 179 | 185 |
| FlexuralModulus (kg/cm$^3$) | 17400 | 18500 | 19000 | 18800 | 20000 | 21000 |
| Izod Impact Strength (*Rm.Temp./kg cm/cm) | **NB | **NB | **NB | **NB | **NB | **NB |
| Izod Impact Strength (−30° C./kg-cm/cm) | 6.2 | 5.6 | 5.2 | 5.8 | 4.5 | 4.5 |
| Heat Deflection Temperature (° C.) | 115 | 113 | 114 | 110 | 110 | 115 |
| Linear Thermal Expansion Coefficient (x 10$^{-5}$) (mm/mm-° C.) | 4.1 | 3.9 | 4.2 | 4.0 | 4.0 | 3.8 |

TABLE 7-continued

Test Results

| Physical Property | *Ex. 1 | *Ex. 2 | *Ex. 3 | *Ex. 4 | *Ex. 5 | *Ex. 6 |
|---|---|---|---|---|---|---|
| Mold Shrinkage (0.1%) | 3.8 | 3.7 | 4.0 | 4.2 | 4.2 | 3.5 |
| Heat Sag (mm) | 2.2 | 1.8 | 1.7 | 1.9 | 2.5 | 2.4 |
| Coating Adhesiveness (Unremoved Grids/100) | 100/100 | 100/100 | 100/100 | 100/100 | 100/100 | 100/100 |

*Rm. Temp. = Room Temperature
**NB = non-break

TABLE 8

| Physical Property | *Comp. Ex. 1 | *Comp. Ex. 2 | *Comp. Ex. 3 | *Comp. Ex. 4 | *Comp. Ex. 5 | *Comp Ex. 6 |
|---|---|---|---|---|---|---|
| Melt Index (g/10 mm) | 12 | 16 | 15 | 10 | 13 | 15 |
| Tensile Strength (kg/cm$^3$) | 170 | 165 | 164 | 175 | 168 | 170 |
| Flexural Modulus (kg/cm$^3$) | 14500 | 15000 | 15200 | 16000 | 17000 | 15100 |
| Izod Impact Strength (**Rm Temp./kg-cm/cm) | ***NB | ***NB | 40 | 42 | 38 | ***NB |
| Izod Impact Strength (−30° C./kg-cm/cm) | 4.2 | 4.5 | 3.8 | 3.8 | 3.5 | 4.0 |
| Heat Deflection Temperature (° C.) | 100 | 102 | 105 | 107 | 110 | 98 |
| Linear Thermal Expansion Coefficient (× 10$^{-5}$) (mm/mm-° C.) | 5.7 | 6.3 | 6.0 | 5.8 | 5.5 | 6.0 |
| Mold Shrinkage (0.1%) | 4.5 | 4.8 | 4.4 | 4.0 | 3.9 | 5.0 |
| Heat Sag (mm) | 5.2 | 5.3 | 5.7 | 6.0 | 6.5 | 5.4 |
| Coating Adhesiveness (No. of Unremoved Grids/100) | 100/100 | 100/100 | 100/100 | 100/100 | 100/100 | 100/100 |

*Comp. Ex. = Comparative Example
**Rm. Temp. = Room Temperature
***NB = non-break As shown in the above, the polyolefin-based composite resin compositions of the present invention exhibit, compared to the comparative examples, superiorities in such as mechanical strength, impact resistance, heat resistance, injection molding plasticity, surface smoothness of product as well as having low heat sag, low shrinkage, and low linear thermal expansion coefficient and thus result in having improved dimensional stability of products. As a result, they can substitute for polycarbonate/polybutylene terephthalate alloy as external parts of an automobile thus contributing to the manufacture of an automobile with low body weight and excellent appearance.

What is claimed is:

1. A polyolefin-based composite resin composition having high strength and low linear thermal expansion comprising:
    (i) 30–80% by weight of a crystalline ethylene-propylene copolymer;
    (ii) 5–40% by weight of an ethylene-α-olefin copolymer;
    (iii) 5–40% by weight of an inorganic fortifier; and
    (iv) additives; wherein said crystalline ethylene-propylene copolymer contains 0.5–35% by weight of ethylene-propylene rubber and comprises at least one ethylene-propylene copolymer having a melt index of 5–60 g/10 mm (230° C. 2.16 kg) wherein said ethylene-propylene copolymer consists of 1–50% by weight of ethylene and 50–99% by weight of propylene.

2. The polyolefin-based composite resin composition of claim 1, said ethylene-α-olefin copolymer contains 20–50% by weight of α-olefin and comprises at least one ethylene-α-olefin copolymer having a melt index of 0.1–15 g/10 mm (230° C., 2.16 kg).

3. The polyolefin-based composite resin composition of claim 1, wherein said α-olefin in said ethylene-α-olefin copolymer is selected from the group consisting of 1-propylene, 1-butene, 1-hexene, and 1-octene.

4. A polyolefin-based composite resin composition having high strength and low linear thermal expansion comprising:
    (i) 30–80% by weight of a crystalline ethylene-propylene copolymer:
    (ii) 5–40% by weight of an ethylene-☐-olefin copolymer:
    (iii) 5–40% by weight of an inorganic fortifier; and
    (iv) additives, wherein said ethylene-α-olefin copolymer contains 20–50% by weight of propylene and 5–20 % by weight of ethylene-propylene copolymer rubber having a melt index of 0.1–5 g/10 mm (230° C., 2.16 kg).

5. A polyolefin-based composite resin composition having high strength and low linear thermal expansion comprising:
    (i) 30–80% by weight of a crystalline ethylene-propylene copolymer;

(ii) 5–40% by weight of an ethylene-α-olefin copolymer;

(iii) 5–40% by weight of an inorganic fortifier; and (iv) additives, wherein said ethylene-α-olefin copolymer contains 20–50% by weight of octene and 5–20% by weight of ethylene-octene copolymer rubber having a melt index of 0.1–15 g/10 mm (230° C., 2.16 kg).

6. The polyolefin-based composite resin composition of claim 1, wherein said inorganic fortifier is selected from the group consisting of talc, calcium-carbonate, mica, glass fiber, asbestos and kaolin.

7. The polyolefin-based composite resin composition of claim 6, wherein said talc is planar aspect and has an average particle size of 2–4 μm and aspect ratio of 3–20.

8. The polyolefin-based composite resin composition of claim 1, wherein said additives comprise 0.05–0.5% by weight of a phenol-based primary antioxidant, 0.05–0.5% by weight of an amine-based secondary antioxidant, 0.05–0.5% by weight of a hals-based UV stabilizer, 0.05–0.1% by weight of a processed lubricant, 0.05–3% by weight of an aminotitanium-based or aminosilane-based coupling agent, and 0.05–0.1% by weight of an alkylamine-based antistatic agent.

9. An exterior part of an automobile comprising the polyolefin-based composite resin composition of claim 1.

10. A polyolefin-based composite resin composition having high strength and low linear thermal expansion comprising:

between about 45% and about 55% by weight of a crystalline ethylene-propylene copolymer, wherein at least 30% by weight of the composition comprises a crystalline ethylene-propylene copolymer with a melt index of between about 40 and about 60;

between about 20 and about 30% by weight of an ethylene-α-olefin copolymer, wherein at least 5–20% by weight of the ethylene-α-olefin is an ethylene-propylene copolymer containing 20–50% by weight of propylene and 5–20% by weight of ethylene-propylene copolymer rubber having a melt index of about 0.5 to about 4 g/10 mm (230° C., 2.16 kg), or contains 20–50% by weight of octene and 5–20% by weight of ethylene-octene copolymer rubber having a melt index of about 3 to about 15 g10 mm (230° C., 2.16 kg), or a mixture thereof between about 20 and about 30% by weight of an inorganic fortifier with an aspect ratio of at least 6 and with an average particle size of between about 1 and about 8 microns; and between about 0.2 and about 3% of additives.

11. The polyolefin-based composite resin composition of claim 10, wherein said ethylene-α-olefin copolymer contains 20–50% by weight of propylene and 5–20% by weight of ethylene-propylene copolymer rubber having a melt index of 1 to about 4 g/10 mm (230° C., 2.16 kg).

12. The polyolefin-based composite resin composition of claim 1, wherein said ethylene-α-olefin copolymer contains 20–50% by weight of octene and 5–20% by weight of ethylene-octene copolymer rubber having a melt index of 5 to about 12 g/10 mm (230° C., 2.16 kg).

13. The polyolefin-based composite resin composition of claim 10, wherein said inorganic fortifier comprises talc which has an average particle size of 2–4 μm.

14. The polyolefin-based composite resin composition of claim 10, wherein said additives comprise 0.05–0.5% by weight of a phenol-based primary antioxidant, 0.05–0.5% by weight of an amine-based secondary antioxidant, 0.05–0.5% by weight of a hals-based UV stabilizer, 0.05–0.1% by weight of a processed lubricant, 0.05–3% by weight of an aminotitanium-based or aminosilane-based coupling agent, and 0.05–0.1% by weight of an alkylamine-based antistatic agent.

15. A polyolefin-based composite resin composition having high strength and low linear thermal expansion comprising:

between about 40% and about 60% by weight of a crystalline ethylene-propylene copolymer manufactured by polymerization of monomers in the presence of a combinatory catalyst, a Ziegler-Natta type catalyst, and an alkylaluminium compound or under a catalyst containing a titanium compound or a magnesium compound and containing between about 18 and about 34% of ethylene-propylene rubber, wherein the degree of crystallinity is between about 20 and about 30% and the melt index of the crystalline ethylene-propylene copolymer of the present invention is preferred to be between about 5 and about 60 g/10 mm (210° C., 2.16 kg);

between about 15 and about 35% by weight of an ethylene-α-olefin copolymer wherein the α-olefin is selected from the group consisting of 1-propylene, 1-butene, 1-hexene, 1-octene, or mixtures thereof, wherein the ethylene-α-olefin copolymer is polymerized from monomers using a Ziegler-Natta catalyst, a vanadium-based catalyst, a chromium-based catalyst, or mixtures thereof, and comprise between 20 and 50% by weight of the α-olefin, and at least 5% by weight of ethylene-α-olefin copolymer rubber;

between about 15and about 30% by weight of an inorganic fortifier with an aspect ratio of at least 6 and with an average particle size of between about 1 and about 8 microns; and between about 0.2 and about 3% of additives.

16. The polyolefin-based composite resin composition of claim 15, wherein the crystalline ethylene-propylene copolymer rubber is directly manufactured by introducing excessive amount of gaseous ethylene into a reactor during the polymerization of the ethylene and propylene copolymers.

17. The polyolefin-based composite resin composition of claim 15, wherein said inorganic fortifier is selected from the group consisting of talc, calcium-carbonate, mica, glass fiber, asbestos and kaolin; and wherein the additives are selected from the group consisting of: 0.05–0.5% by weight of a phenol-based primary antioxidant, 0.05–0.5% by weight of an amine-based secondary antioxidant, 0.05–0.5% by weight of a hals-based UV stabilizer, 0.05–0.1% by weight of a processed lubricant, 0.05–3% by weight of an aminotitanium-based or aminosilane-based coupling agent, 0.05–0.1% by weight of an alkylamine-based antistatic agent, and mixtures or combinations thereof.

18. The polyolefin-based composite resin composition of claim 4, wherein said crystalline ethylene-propylene copolymer contains 0.5–35% by weight of ethylene-propylene rubber and comprises at least one ethylene-propylene copolymer having a melt index of 5"60 g/10 mm (230° C., 2.16 kg) wherein said ethylene-propylene copolymer consists of 1–50% by weight of ethylene and 50–99% by weight of propylene.

19. The polyolefin-based composite resin composition of claim 4, wherein said inorganic fortifier is selected from the group consisting of talc, calcium-carbonate, mica, glass fiber, asbestos and kaolin; and wherein said additives are selected from the group consisting of: 0.05–0.5% by weight of a phenol-based primary antioxidant, 0.05–0.5% by weight of an amine-based secondary antioxidant, 0.05–0.5% by weight of a hals-based UV stabilizer, 0.05–0.1% by weight of a processed lubricant, 0.05–3% by weight of an aminotitanium-based or aminosilane-based coupling agent, 0.05–0.1% by weight of an alkylamine-based antistatic agent, and mixtures or combinations thereof.

20. The polyolefin-based composite resin composition of claim 5, wherein; said crystalline ethylene-propylene copolymer contains 0.5–35% by weight of ethylene-propylene rubber and comprises at least one ethylene-propylene copolymer having a melt index of 5–60g/10 mm (230° C., 2.16 kg) wherein said ethylene-propylene copolymer consists of 1–50% by weight of ethylene and 50–99% by weight of propylene.

21. The polyolefin-based composite resin composition of claim 4, wherein said inorganic fortifier is selected from the group consisting of talc, calcium-carbonate, mica, glass fiber, asbestos and kaolin and wherein said additives are selected from the group consisting of: 0.05–0.5% by weight of a phenol-based primary antioxidant, 0.05–0.5% by weight of an amine-based secondary antioxidant, 0.05–0.5% by weight of a hals-based UV stabilizer, 0.05–0.1% by weight of a processed lubricant, 0.05–3% by weight of an aminotitanium-based or aminosilane-based coupling agent, 0.05–0.1% by weight of an alkylamine-based antistatic agent, and mixtures or combinations thereof.

* * * * *